US012803158B2

(12) United States Patent
Singhvi et al.

(10) Patent No.: US 12,803,158 B2
(45) Date of Patent: Nov. 17, 2026

(54) ULTRA-COMPACT WIDEBAND LTE IOT METAL STAMPED ANTENNA FOR WATER METER

(71) Applicant: Honeywell International Inc., Charlotte, NC (US)

(72) Inventors: Shalu Singhvi, Hyderabad (IN); Piramanayagam Sankaran, Hyderabad (IN); Piyush Uday Gangwal, Pune (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 58 days.

(21) Appl. No.: 18/672,426

(22) Filed: May 23, 2024

(65) Prior Publication Data

US 2025/0337159 A1 Oct. 30, 2025

(51) Int. Cl.

| | |
|---|---|
| ***H01Q 1/50*** | (2006.01) |
| ***H01Q 1/40*** | (2006.01) |
| ***H01Q 9/04*** | (2006.01) |

(52) U.S. Cl.

CPC ................. *H01Q 1/50* (2013.01); *H01Q 1/40* (2013.01); *H01Q 9/0421* (2013.01)

(58) Field of Classification Search

CPC ........... H01Q 1/50; H01Q 1/40; H01Q 9/0421

See application file for complete search history.

(56) References Cited

U.S. PATENT DOCUMENTS

| | | | | |
|---|---|---|---|---|
| 9,093,744 | B2 | 7/2015 | Seal et al. | |
| 10,468,769 | B2 | 11/2019 | Ahn et al. | |
| 11,119,133 | B2 * | 9/2021 | Bonicatto | H01Q 1/2233 |
| 2019/0041920 | A1 * | 2/2019 | Spanier | H01Q 1/2233 |
| 2023/0318182 | A1 | 10/2023 | Liu | |
| 2024/0106118 | A1 | 3/2024 | Yang | |

FOREIGN PATENT DOCUMENTS

| | | | |
|---|---|---|---|
| CN | 113471662 | A | 10/2021 |
| CN | 218041659 | A | 12/2022 |
| CN | 116337169 | A | 6/2023 |
| WO | 2017076750 | A1 | 5/2017 |

OTHER PUBLICATIONS

Ahmed Mansour, Nader Shehata, and Mohamed Azab, "Flexible paper-based wideband antenna for compact-size IoT devices," Conference Paper • Oct. 2017, DOI: 10.1109/IEMCON.2017.8117184.

* cited by examiner

*Primary Examiner* — Seung H Lee

(74) *Attorney, Agent, or Firm* — Ingrassia Fisher & Lorenz

(57) ABSTRACT

An antenna apparatus can include an antenna and a plastic substrate that can support two or more different metal structures for the antenna, wherein the antenna includes a quarter wavelength antenna structure pattern bent to fit a limited area and in proximity to metal components and slotted to achieve transmitter radiated power for wideband frequencies. The antenna apparatus can further include a radiating element, mounted above the ground plane and having multiple branches above ground plane to achieve wideband frequencies. The antenna apparatus can also include a parasitic element that improves a resonant frequency in a high frequency band.

20 Claims, 3 Drawing Sheets

ULTRA-COMPACT WIDEBAND LTE IOT METAL STAMPED ANTENNA FOR WATER METER

CROSS-REFERENCE TO RELATED PATENT APPLICATION

This patent application claims priority to Indian Provisional Patent Application No. 202411034421, filed Apr. 30, 2024, which is incorporated herein by reference in its entirety.

TECHNICAL FIELD

Embodiments are generally related to devices for transmitting or receiving electromagnetic waves, including antennas used in communication, wireless networks, and other applications. Embodiments further relate to antennas used with battery powered devices such as water meters. Embodiments further relate to wideband antennas. Embodiments also relate to metering devices such as water meters equipped with wireless communications devices and systems that support multiple frequency bands.

BACKGROUND

Long-Term Evolution Category Narrowband IoT (LTE CAT NB1) has emerged as a favored Low Power Wide Area Network (LPWAN) solution for battery-powered devices, particularly in applications such as water metering. This preference stems from its attributes including extensive coverage, reliable and secure communication, and minimal battery consumption.

Water meters equipped with Narrowband IoT (NBIoT) as their communication technology necessitate the support of multiple frequency bands, which can vary depending on the network provider (carrier) and geographical location. To ensure seamless NBIoT wireless connectivity wherever available, it is imperative to support global NBIOT frequency bands.

Critical to maintaining wireless connection efficiency and reliability, a minimum Transmitter Radiated Power (TRP) of 18 dBm is needed across all frequency bands including B1 (2100), B3 (1800), B5 (850), B8 (900), B20 (800) and B28 (700).

However, achieving the required antenna radiation performance within the constraints of water meter installations presents a significant challenge. The maximum overall height of water meters, coupled with the proximity of other active or metal components such as LCDs, NFC modules, and batteries, poses limitations. Notably, lower frequencies demand greater antenna height, which often exceeds the allowable dimensions for water meter installations, particularly concerning the B28 (700 MHZ) frequency band.

Moreover, water meter electronics are commonly encapsulated or potted to shield them from harsh environmental conditions, further complicating the task of achieving the necessary radiation performance Mass manufacturing introduces variability in antenna performance due to disparities in antenna metal structure during assembly. Additionally, the performance of antenna RF connectors deteriorates under potting materials, exacerbating the challenge of maintaining consistent and reliable connectivity.

BRIEF SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

It is, therefore, one aspect of the embodiments to provide for an improved wideband antenna that can be used with battery powered devices such as water meters.

It is another aspect of the embodiments to provide for an improved wideband antenna.

It is a further aspect of the embodiments to provide for a Planar Inverted-F Antenna (PIFA) quarter wavelength LTE IoT antenna.

The aforementioned aspects and other objectives can now be achieved as described herein. An antenna apparatus can include: an antenna and a plastic substrate that supports at least two different metal structures for the antenna, wherein the antenna includes a quarter wavelength antenna structure pattern bent to fit a limited area and in proximity to metal components and slotted to achieve transmitter radiated power for wideband frequencies; a radiating element, mounted above the ground plane and having multiple branches above ground plane to achieve wideband frequencies; and a parasitic element that improves a resonant frequency in a high frequency band.

An embodiment of the antenna apparatus can include a feeding leg and a shorting pin.

In an embodiment of the antenna apparatus, the feeding leg can support a first branch of the radiating element above a ground plane and can electrically couple the first branch to an RF feeding port and an impedance matching network.

In an embodiment of the antenna apparatus, the shorting pin can support a second branch of the radiating element above a ground plane and can electrically couple the second branch to a printed circuit board.

In an embodiment of the antenna apparatus, the plastic substrate can control antenna radiation performance variation for mass manufacturing.

In an embodiment of the antenna apparatus, an antenna can be directly connected to an RF feeding port to element RF connector to address performance issues under a potting material.

In an embodiment of the antenna apparatus, an antenna can be partially potted to protect electronics from harsh environmental conditions.

In an embodiment, an antenna apparatus can include: an antenna and a plastic substrate that supports at least two different metal structures for the antenna, wherein the antenna includes a quarter wavelength antenna structure pattern bent to fit a limited area and in proximity to metal components and slotted to achieve transmitter radiated power for wideband frequencies; and a radiating element, mounted above the ground plane and having multiple branches above ground plane to achieve wideband frequencies.

In an embodiment, a method of operating an antenna apparatus, can involve: achieving a transmitter radiated bower for wideband frequencies with an antenna and a plastic substrate that supports at least two different metal structures for the antenna, wherein the antenna includes a quarter wavelength antenna structure pattern bent to fit a limited area and in proximity to metal components and slotted to achieve the transmitter radiated power for the wideband frequencies; utilizing a radiating element, mounted above the ground plane and having multiple branches above ground plane to achieve the wideband frequencies; and improving a resonant frequency in a high frequency band with a parasitic element associated with the antenna apparatus.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

In the drawings described and illustrated herein, identical or similar parts and elements are generally indicated by identical reference numerals.

DETAILED DESCRIPTION

Figure 1:
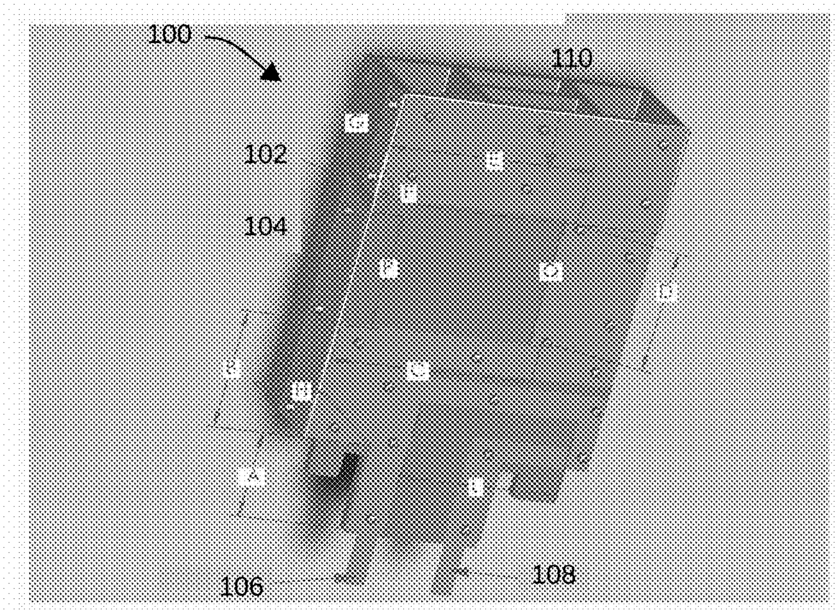
FIG. 1 illustrates a front perspective view of an antenna that can radiate in NBIOT frequency bands B3, B8, B20, in accordance with an embodiment.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other issues, subject matter may be embodied as methods, devices, components, or systems. Accordingly, embodiments may, for example, take the form of hardware, software, firmware, or a combination thereof. The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the terms "one or more" or "at least one" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. Furthermore, the term "at least one" as utilized herein can refer to "one or more". For example, "at least one widget" may refer to "one or more widgets".

The disclosed embodiments relate to two distinct types of LTE IoT antennas, sharing the same physical dimensions, and which can be tailored specifically for water meters and capable of supporting frequency bands ranging from 700 to 2100 MHz. These antennas can utilize a metal stamped radiating component affixed to a plastic substrate. The plastic substrate can serve a dual purpose: it provides structural support to the antenna and helps manage variations in antenna radiation performance during large-scale production.

Both antennas can feature a standardized plastic substrate, form factor, and connector pins, facilitating compatibility with the same housing and printed circuit board assembly (PCBA). The antenna design incorporates a two-point electrical coupling system, connecting the RF feeding port and ground. To safeguard the internal electronics from water ingress, a portion of the feeding leg extends beneath the potting material, while the remainder, along with the radiating element, remains above it to meet the required radiation performance standards.

The mechanical structure of the antenna can be engineered with a unique polarization configuration, ensuring omni-directional radiation performance across a broad spectrum of frequencies, from low to high bands. Streamlined assembly for mass production is achieved through a straightforward process requiring only two-point soldering and press fitting to attach the antenna to the electronic PCB.

Moreover, the plastic structure of the antenna is intricately designed to support the radiating element, minimizing variation and facilitating secure placement on the PCB through multiple ribs. Additionally, the design of the antenna embodiments discussed herein can allow for the efficient flow of potting material during encapsulation, thereby enhancing protection for the internal electronics.

FIG. 1 illustrates a front perspective view of an antenna apparatus 100, which can be implemented in accordance with an embodiment. The antenna apparatus 100 depicted in FIG. 1 can be implemented as or with a narrowband internet-of-things (NBIOT or NBIoT) device. The antenna apparatus 100 can include a parasitic element 102 and a high frequency radiator 104. In addition, the antenna apparatus 100 can be designed to include a low frequency radiator 110. The antenna apparatus 100 can further include an RF feeder or feeder leg 106 and a shorting pin 108.

In some embodiments, the antenna apparatus 100 may be implemented as a PIFA quarter wavelength antenna with two different lengths ~110 mm (A+B+C+D+E+F+G+H) for 800 Mhz-2100 Mhz and ~120 mm (A+B+C+D+E+F+G+H) length for 700 Mhz to operate in NBIOT Bands B1 (2100), B3 (1800), B5 (850), B8 (900), B20 (800), B28 (700) as a main radiating patch. Note that slots L, M, Q and radiating element length P shown in FIG. 1 can be derived for resonant frequency in a high frequency band to improve return loss. The position of the RF feeding point or feeder leg 106 and the shorting plate (gnd) or ground leg 108 can be derived to obtain the best results. Additionally, the parasitic element 102 can be used to fine tune the resonance frequency in a high frequency band. The parasitic element 102 can be implemented as a passive component positioned near the active radiating element, influencing antenna performance without direct electrical connection to the feed line.

Note that as utilized herein, the acronym PIFA represents "Planar Inverted-F Antenna," which is a type of antenna that can be used in wireless communication devices, such as, for example, mobile phones and other portable electronic devices or field devices. In a PIFA antenna, the radiating element can be implemented as a thin, planar structure with a specific shape resembling the letter "F". The antenna apparatus 100 (and similarly the antenna apparatus 101 shown in FIG. 2) can be designed to operate at a quarter wavelength, which means its physical length is approximately one-fourth of the wavelength of the electromagnetic waves it's intended to transmit or receive.

The "inverted" part of the name refers to the fact that the antenna is mounted above a ground plane, while the "planar" aspect indicates that it lies in a single plane. This design makes PIFA antennas compact and suitable for integration into the limited space available in modern electronic devices. They're known for their efficiency, low profile, and relatively wide bandwidth.

Figure 2:
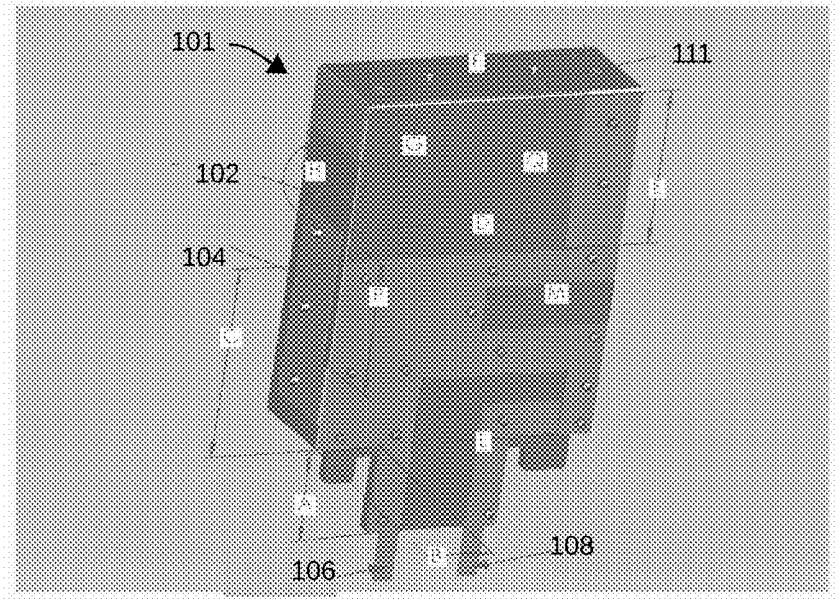
FIG. 2 illustrates a front perspective view of another antenna which can radiate in NBIOT frequency bands B3, B28, in accordance with an embodiment.

FIG. 2 illustrates a view of an antenna apparatus 101, which can be implemented in accordance with another embodiment. The antenna apparatus 101 depicted is similar to the antenna apparatus 100 albeit with some slight differences. For example, the antenna apparatus 101 includes a radiating element comprising a low frequency radiator 111, which can be configured in a different arrangement that that of the low frequency radiator 110. In the example embodiment shown in FIG. 1, the antenna apparatus 100 can be an NBIOT B3/B8/B20 type antenna while in the example embodiment depicted in FIG. 1, the antenna apparatus 101 may be an NBIOT B3/B28 type antenna. The other components of the embodiment depicted FIG. 2 are similar to those of the embodiment shown in FIG. 1.

Figure 3:
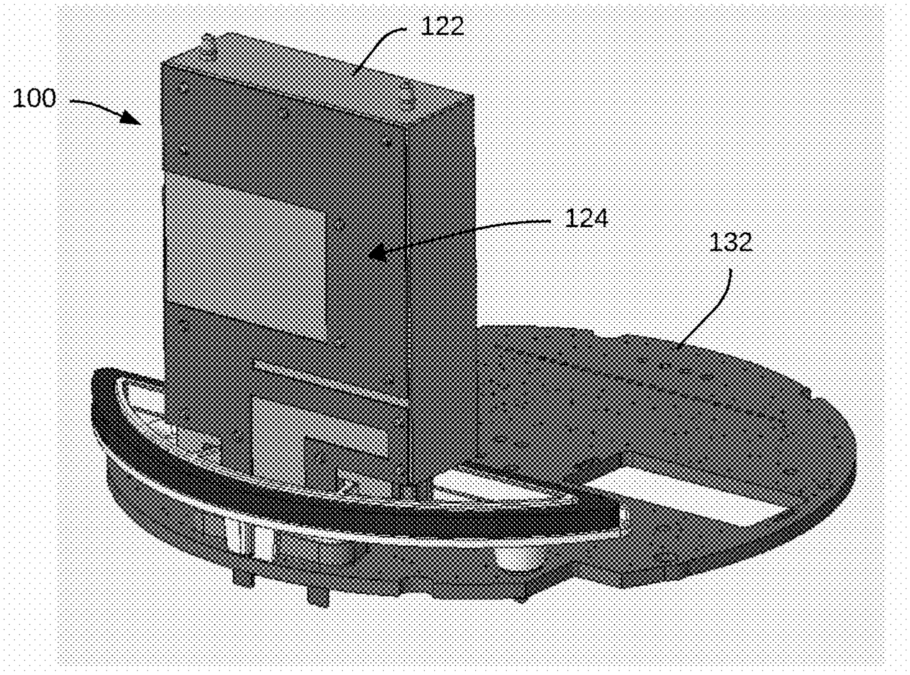
FIG. 3 illustrates a view of the antenna above PCB ground plane shown in FIG. 1, in accordance with an embodiment.

FIG. 3 illustrates a view of the antenna apparatus 100 shown in FIG. 1 above PCB ground plane, in accordance with an embodiment. As shown in FIG. 3, the antenna apparatus 100 can further include a plastic substrate 122 and a metal formed antenna 124. The plastic substrate 122 can provides structural support to the antenna apparatus 100 while also managing variations in antenna radiation performance during, for example, large-scale production. The structure of the plastic substrate 122 can be intricately designed to support the radiating elements, minimizing variation and facilitating secure placement on a printed circuit board PCB 132 through multiple ribs.

Figure 4:
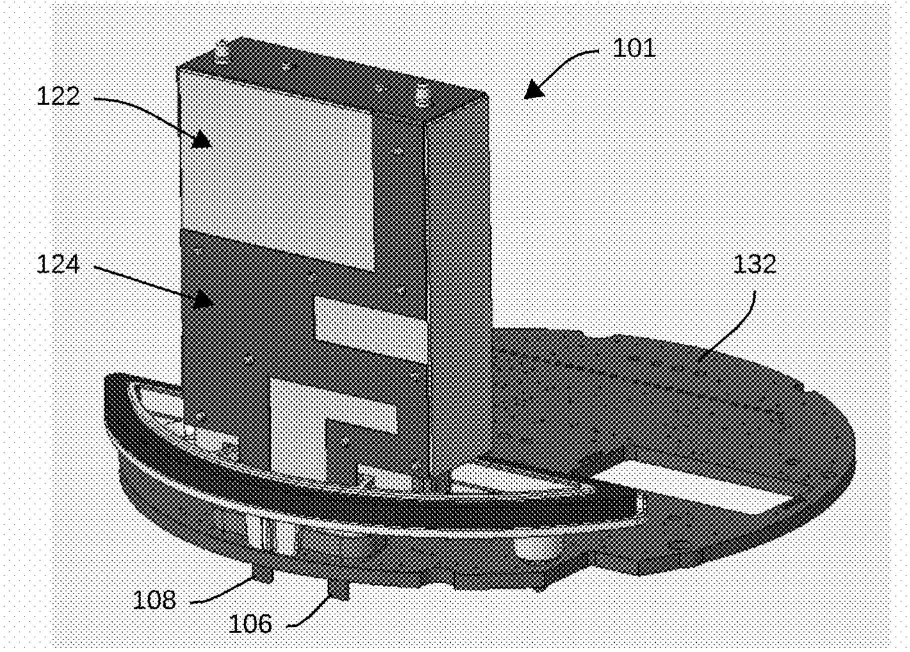
FIG. 4 illustrates a view of the antenna above PCB ground plane depicted in FIG. 2, in accordance with an embodiment.

FIG. 4 illustrates a view of the antenna apparatus 101 depicted in FIG. 2 above PCB ground plane, in accordance with an embodiment. The embodiment shown in FIG. 4 is similar to that of the embodiment shown in FIG. 3, with different configurations for the metal formed antenna 124. The antenna apparatus 101 can be located on and secured to the PCB 132. The feeder leg 106 and the shorting pin 108 are also shown in FIG. 4.

Figure 5:
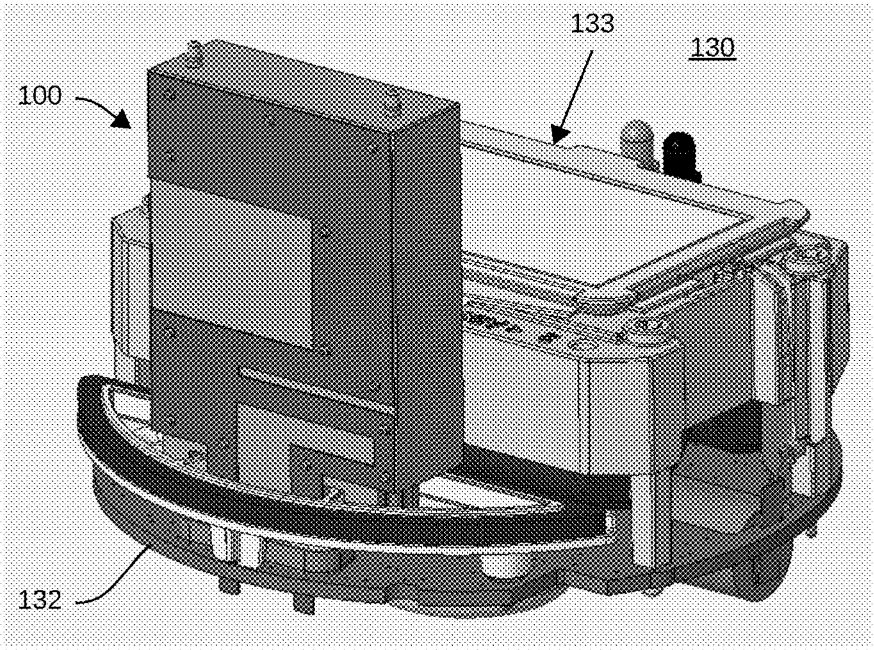
FIG. 5 illustrates a perspective view of an antenna assembly of FIG. 1 that includes the antenna apparatus with the antenna assembly deployed on the printed circuit board, in accordance with an embodiment.

FIG. 5 illustrates a perspective view of an antenna assembly 130 that includes the antenna apparatus 100 with the antenna assembly 130 deployed on the printed circuit board 132, along with other metallic components such as the liquid crystal display (LCD) 133 in accordance with an embodiment.

Figure 6:
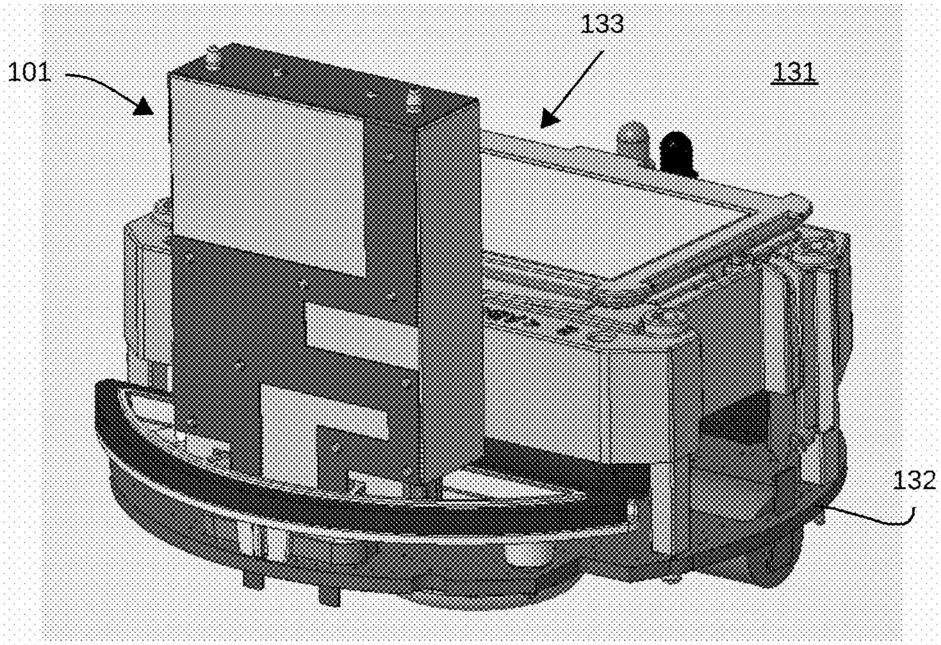
FIG. 6 illustrates a perspective view of an antenna assembly of FIG. 2 that includes the antenna apparatus deployed on the printed circuit board in association with the communications module, in accordance with an embodiment.

FIG. 6 illustrates a perspective view of an antenna assembly 131 that includes the antenna apparatus 101 deployed on the printed circuit board 132, and other metallic components such as the LCD 133 in accordance with an embodiment.

The antenna apparatus 100 and the antenna apparatus 101 demonstrate that precise design considerations, such as the inclusion of parasitic elements, resonator lengths, and feeding points, can optimize performance across a range of frequency bands. By leveraging the compact and efficient nature of PIFA technology, antenna apparatus 101 and antenna apparatus 101 offer a solution that balances performance, size, and bandwidth requirements, making them ideal for integration into water meters, ultimately facilitating seamless connectivity in the Internet-of-Things (IoT) ecosystem.

Each antenna apparatus 100 and 101 is well-suited for integration into water meters. For example, each antenna apparatus 100 and 101 can be designed to be compact and low-profile, making them ideal for installation in small and constrained spaces typical of water meter housings. This compact size ensures that they can be easily integrated without adding bulk to the meter.

Planar Inverted-F Antennas (PIFAs), in particular, are known for their efficiency in transmitting and receiving signals. This efficiency is crucial for ensuring reliable communication metering devices, where accurate data transmission is essential for metering and monitoring purposes.

Although designed for narrowband Internet-of-Things (NBIoT) applications, PIFAs can still offer relatively wide bandwidth compared to other antenna types. This characteristic allows the antennas to support communication across different frequency bands, which may be necessary for diverse communication protocols used in metering systems.

The antenna apparatus 100 and the antenna apparatus 101 can be specifically designed to operate across multiple frequency bands, including those commonly used in NBIoT applications. This flexibility enables them to deploy the water metering systems globally, ensuring compatibility with country specific NBIOT Frequency band The inclusion of parasitic elements such as the parasitic element 102 and precise design considerations, as described herein with respect to the different embodiments, allows for fine-tuning of resonance frequencies. This capability is advantageous for optimizing antenna performance across specific frequency bands, while ensuring optimal signal reception and transmission in metering applications (or other applications and devices).

The slight differences between the antenna apparatus 100 and the antenna apparatus 101, such as the arrangement of low-frequency radiators, allow for versatility in design and deployment. This versatility enables customization of antenna configurations to meet the specific requirements and constraints of different water metering systems.

Each antenna apparatus 100 and 101 can offer a combination of compact size, efficiency, wide bandwidth, frequency band support, fine-tuning capability, and versatility that make them well-suited for integration into water meters, facilitating reliable and efficient communication in metering and monitoring applications.

The wideband antenna devices 100 and 101 can be implemented as low-cost wideband antennas with a number of important features. Each antenna apparatus 100 and 101 can include a ground plane on a PCB and a plastic substrate made of PC or ABS to support two different metal antenna structures. The wideband antenna devices 100 and 101 can also each include a metal radiating element, which can be constructed, for example, from stainless Steel or any other metal, and can be mounted onto the plastic substrate using, for example, heat staking. Each antenna apparatus 100 and 101 can be implemented with quarter-wavelength antenna structures, bent to fit into limited spaces and slotted for achieving, for example, a 18 dBm Total Radiated Power (TRP), cover wideband LTE NBIOT frequencies ranging from, for example, 700 to 2100 MHz.

Each antenna apparatus 100 and 101 comprises a wideband antenna apparatus and can include a main radiating element positioned above the ground plane with multiple branches, which can help to achieve wideband frequencies. In addition, each antenna apparatus 100 and 101 can include a parasitic element, which can improve resonant frequency in the high-frequency band at, for example, 1.75 GHZ (B3). The feeding leg can connect the radiating element to the RF feeding port and impedance matching network, while the shorting pin can connect it to the PCB ground plane.

The plastic substrate can help to control antenna radiation performance variation during mass manufacturing. The wideband antenna devices 100 and 101 are easy to assemble with two-point soldering and press fit, eliminating the need for an RF connector and associated performance issues under potting material. The wideband antenna devices 100 and 101 can also be implemented in a manner involving partial potting. That is, the antenna mounting pins can be partially potted to protect the associated radio and other electronics from harsh environments while maintaining excellent radiation performance.

Based on the foregoing, it can be appreciated that a number of embodiments are disclosed herein, including preferred and alternative embodiments. For example, in an embodiment, an antenna apparatus can be implemented, which can include: an antenna and a plastic substrate that can support at least two different metal structures for the antenna, wherein the antenna can include a quarter wavelength antenna structure pattern bent to fit a limited area and in proximity to metal components and slotted to achieve transmitter radiated power for wideband frequencies; a radiating element, mounted above the ground plane and having multiple branches above ground plane to achieve wideband frequencies; and a parasitic element that can improve the resonant frequency in a high frequency band.

An embodiment of the antenna apparatus can further include a feeding leg and a shorting pin.

In an embodiment of the antenna apparatus, the feeding leg can support a first branch of the radiating element above a ground plane and can electrically couple the first branch to an RF feeding port and an impedance matching network.

In an embodiment of the antenna apparatus, the shorting pin can support a second branch of the radiating element above a ground plane and can electrically couple the second branch to a printed circuit board.

In an embodiment of the antenna apparatus, the plastic substrate can control antenna radiation performance variation for mass manufacturing.

In an embodiment of the antenna apparatus, an antenna can be directly connected to an RF feeding port to element RF connector to address performance issues under a potting material.

In an embodiment of the antenna apparatus, an antenna can be partially potted to protect electronics from harsh environmental conditions.

In an embodiment, an antenna apparatus can include: an antenna and a plastic substrate that supports at least two different metal structures for the antenna, wherein the antenna includes a quarter wavelength antenna structure pattern bent to fit a limited area and in proximity to metal components and slotted to achieve transmitter radiated power for wideband frequencies; and a radiating element, mounted above the ground plane and having multiple branches above ground plane to achieve wideband frequencies.

In an embodiment, a method of operating an antenna apparatus, can involve: achieving a transmitter radiated bower for wideband frequencies with an antenna and a plastic substrate that supports at least two different metal structures for the antenna, wherein the antenna includes a quarter wavelength antenna structure pattern bent to fit a limited area and in proximity to metal components and slotted to achieve the transmitter radiated power for the wideband frequencies; utilizing a radiating element, mounted above the ground plane and having multiple branches above ground plane to achieve the wideband frequencies; and improving a resonant frequency in a high frequency band with a parasitic element associated with the antenna apparatus.

In some embodiments, the aforementioned step or operation of utilizing a radiating element, mounted above the ground plane and having multiple branches above ground plane to achieve the wideband frequencies, can further involve utilizing the radiating element, mounted above the ground plane and having the multiple branches above ground plane to achieve the wideband frequencies with a minimum 18 dBm Total radiated Power in NBIOT bands.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. An antenna apparatus, comprising:

a housing;

a planar inverted-F antenna (PIFA) comprising a radiating element mounted above a ground plane and having multiple branches above the ground plane to achieve wideband frequencies, wherein the planar inverted-F antenna comprises a quarter wavelength antenna structure pattern configured to fit within a limited area of the housing, and wherein the planar inverted-F antenna is slotted to achieve transmitter power for the wideband frequencies;

a plastic substrate that supports the planar inverted-F antenna; and a parasitic element positioned adjacent the radiating element to fine tune a resonant frequency of the radiating element in a high frequency band.

2. The antenna apparatus of claim 1, further comprising a feeding leg.

3. The antenna apparatus of claim 1, further comprising a shorting pin.

4. The antenna apparatus of claim 1, further comprising a feeding leg that supports a first branch of the radiating element above the ground plane and electrically coupling the first branch to an RF feeding port and an impedance matching network.

5. The antenna apparatus of claim 1, further comprising a shorting pin supporting a second branch of the radiating element above the ground plane and electrically coupling the second branch to a printed circuit board.

6. The antenna apparatus of claim 1, wherein the plastic substrate controls an antenna radiation performance variation for mass manufacturing.

7. The antenna apparatus of claim 1, further comprising the planar inverted-F antenna directly connected to an RF feeding port to element RF connector to address performance issues under a potting material.

8. The antenna apparatus of claim 1, wherein the planar inverted-F antenna is partially potted to protect electronics from harsh environmental conditions.

9. The antenna apparatus of claim 1, further comprising:
- a feeding leg that supports a first branch of the radiating element above the ground plane and electrically coupling the first branch to an RF feeding port and an impedance matching network; and
- a shorting pin supporting a second branch of the radiating element above the ground plane and electrically coupling the second branch to a printed circuit board.

10. The antenna apparatus of claim 9, wherein the plastic substrate controls an antenna radiation performance.

11. The antenna apparatus of claim 9, wherein the planar inverted-F antenna is directly connected to the RF feeding port to eliminate RF connector performance issues under a potting material.

12. An antenna apparatus, comprising:
- a housing;
- a planar inverted-F (PIFA) antenna comprising a radiating element mounted above a ground plane and having multiple branches above the ground plane to achieve wideband frequencies, wherein the PIFA antenna comprises a quarter wavelength antenna structure pattern configured to fit within a limited area of housing, and wherein the PIFA antenna is slotted to achieve transmitter power for the wideband frequencies; and
- a plastic substrate that supports the PIFA antenna.

13. The antenna apparatus of claim 12, further comprising a parasitic element positioned adjacent the radiating element to fine tune a resonant frequency of the radiating element in a high frequency band.

14. The antenna apparatus of claim 12, further comprising a feeding leg that supports a first branch of the radiating element above the ground plane and electrically coupling the first branch to an RF feeding port and an impedance matching network.

15. The antenna apparatus of claim 12, further comprising a shorting pin supporting a second branch of the radiating element above the ground plane and electrically coupling the second branch to a printed circuit board.

16. The antenna apparatus of claim 12, wherein the plastic substrate controls an antenna radiation performance variation for mass manufacturing.

17. The antenna apparatus of claim 12, wherein the planar inverted-F antenna is directly connected to an RF feeding port to element RF connector to address performance issues under a potting material.

18. The antenna apparatus of claim 12, wherein the planar inverted-F antenna is partially potted to protect electronics from harsh environmental conditions.

19. A method of operating an antenna apparatus, comprising:
- providing a planar inverted-F antenna (PIFA) comprising a radiating element for achieving a transmitter radiated power for wideband frequencies, wherein the radiating element is mounted above a ground plane and has multiple branches above the ground plane to achieve the wideband frequencies with a minimum 18 dBm Total radiated Power in NBIOT bands;
- providing a plastic substrate to support the planar inverted-F antenna; and
- providing a parasitic element adjacent the radiating element for improving a resonant frequency of the radiating element in a high frequency band.

20. The method of claim 19, further comprising:
- providing a feeding leg for supporting a first branch of the radiating element above the ground plane, wherein the first branch is electrically coupled to an RF feeding port and an impedance matching network; and
- providing a shorting pin for supporting a second branch of the radiating element above the ground plane, wherein the second branch is electrically coupled to a printed circuit board.

* * * * *